A. W. CASH.
FLUID PRESSURE REGULATOR.
APPLICATION FILED JUNE 28, 1915.
1,249,596. Patented Dec. 11, 1917.
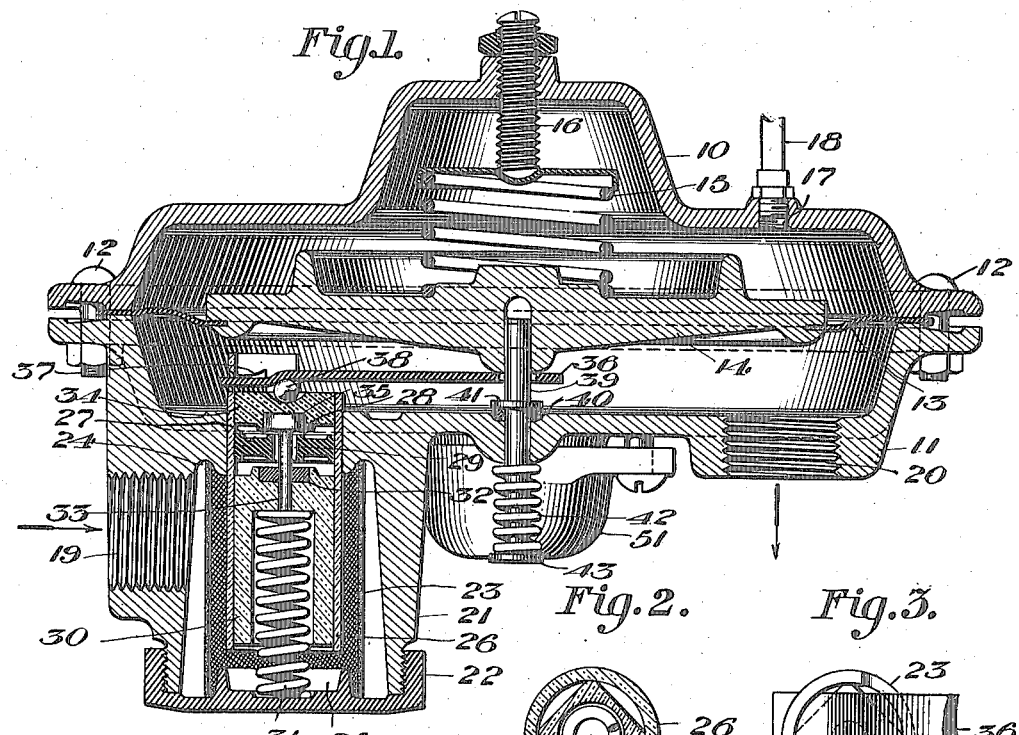
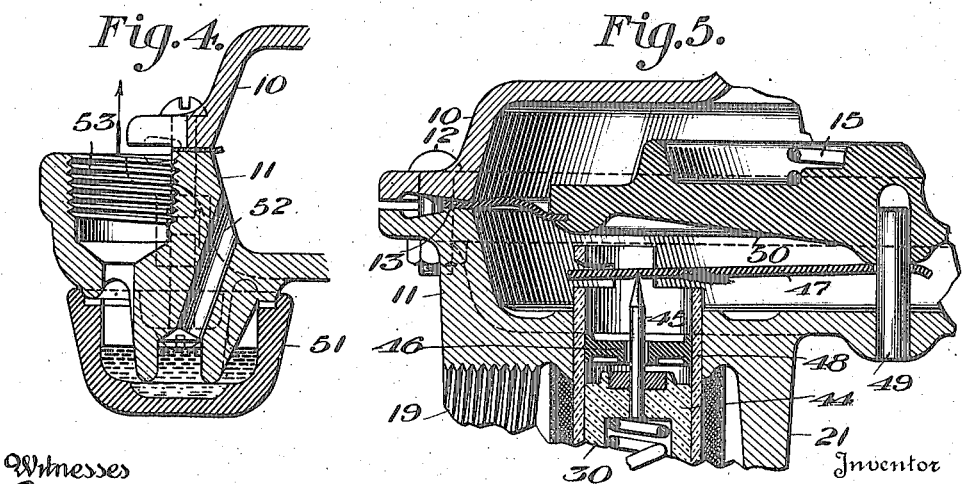

UNITED STATES PATENT OFFICE.

ARTHUR W. CASH, OF DECATUR, ILLINOIS, ASSIGNOR TO H. MUELLER MANUFACTURING CO., A CORPORATION OF ILLINOIS.

FLUID-PRESSURE REGULATOR.

1,249,596.   Specification of Letters Patent.   Patented Dec. 11, 1917.

Application filed June 28, 1915. Serial No. 36,829.

*To all whom it may concern:*

Be it known that I, ARTHUR W. CASH, a citizen of the United States, residing at Decatur, in the county of Macon and State of Illinois, have invented new and useful Improvements in Fluid-Pressure Regulators, of which the following is a specification.

The present invention relates to fluid pressure regulators, and in its present embodiment is designed more particularly for use in the regulation of gas, although it is obvious that the invention is adaptable to the regulation of any fluid.

The invention has for its object also the automatic cutting off of the flow of fluid through it in event of breakage or derangement of the piping or fixtures on the outlet or inlet sides of the regulator, so as to guard against the continued flow of gas or other fluid when conditions are such as to endanger life or property.

It embodies as well starting means for initiating the operation of the regulator either when first installed, or after it has automatically cut out the flow of fluid to the point of consumption by reason of some breakage or derangement in the line.

In the drawings herewith, which form a part of this specification, I have shown one embodiment of my invention, although as this is illustrative and not restrictive of the invention, it will be understood that it may be varied within the range of mechanical skill without departing from the spirit thereof.

In the said drawings:

Figure 1 is a vertical section of a regulator constructed in accordance with my invention.

Fig. 2 is a detail cross sectional view of the valve casing and regulating valve.

Fig. 3 is a detail plan view of a portion of the valve operating lever and its fulcrum.

Fig. 4 is a detail view of the safety seal or blow-out with which the regulator is equipped.

Fig. 5 is a vertical sectional view of a portion of the regulator, in which the automatic cut-out feature embodied in Fig. 1 is dispensed with, and the device is designed to serve simply as a regulating means.

Referring to the drawings by numerals, like numbers indicating like parts in the several views, the regulator casing is formed of two sections, 10 and 11, preferably circular and clamped together by suitable clamping bolts 12, the sections 10 and 11 serving to clamp the flexible diaphragm 13 so as to divide the casing into upper and lower chambers, said diaphragm having, as is not unusual, the rigid plate 14 centrally thereof, and which serves as a weight, tending to depress the diaphragm, a centrally disposed spring 15 adjustable through the screw 16 mounted on the casing 10 serving to force the diaphragm 10 and weight 14 downwardly, as will be obvious, the said casing member 10 having a relief port or opening 17 so as to prevent air cushioning above the diaphragm.

It some times happens that there will be a slight leakage of gas through the diaphragm, or there might be a breakage of the diaphragm which would permit a considerable quantity of gas to collect in the chamber above the diaphragm, and in order that this may be carried away, and not pass into the house, I preferably provide this vent 17 with a leading-off pipe 18, as shown in Fig. 1, which may deliver to the atmosphere, or any suitable receptacle.

The lower casing element 11 is provided with an inlet 19 and an outlet 20, to which inlet and outlet pipes (not shown) of any suitable type are connected. Depending from the casing 11, and preferably formed integrally therewith, is a valve chamber 21 to which the inlet 19 delivers, this valve chamber, as shown, having an unobstructed bore and flaring outwardly, and provided with a closing cap 22 which is suitably secured, as by a threaded engagement with the chamber 20 so as to be fluid tight, thus giving a chamber easily accessible and from which, on removal of cap 22, the contained parts may be readily removed.

Within the chamber 21 is mounted a screen 23 which at one end seats in a groove 24 formed in the lower face of the casing 11, and at its other end is upheld by the cap 22, a positioning rib 25 being provided on the cap, so that the screen 23, while it may be readily removed when the cap 22 is taken off, yet is fixed in position when the parts are assembled, and is centrally positioned with respect to the chamber and its other contained parts.

Within the screen 23, which, of course, excludes all foreign particles brought in by the incoming fluid from the valve, is a valve casing 26 fixed to the casing 11, and depending within the chamber 21. Within this valve casing 26 is mounted the double valve seat 27, this valve seat being fixed and provided on both sides with a valve seating surface, here shown as a circular rib 28, formed by grooving out the upper surface of the valve seat as shown, these ribs surrounding the through port 29, as clearly shown in Fig. 1. Said port 29 forms a passage between the valve chamber 21 and the chamber in the casing 11 below the diaphragm, and said port 29 is controlled by a regulating valve 30, which, as shown in Fig. 2, is polygonal in cross section so as to permit free passage of the fluid, and is centrally bored throughout the major portion of its body to form a recess to receive a spring 31 which seats against the cap 22, and tends to move said valve 30 to its seat. The valve 30 is preferably provided with an inset valve surface 32 of suitable material, designed to bear upon the valve seat 28 and close the port 29.

In order to manipulate the valve 30 there is provided a connecting stem 33 fixed in the upper end of the valve 30 and extending through the port 29, said stem, as shown in Fig. 1, abutting at its upper end a second valve 34 which forms a cut-out valve, being provided with a seating surface 35, similar to the seating surface of the valve 30, designed to seat upon the rib 28 on the other side of the double valve seat 27.

It will be seen that the two valves, 30, which is the regulating valve, and 34, which is the cut-out valve, move together, being connected by the stem 33, and they are operated by means of the lever 36 fulcrumed at its end in a slot 37 formed in an upwardly extending segment of the valve casing 26, as shown in Figs. 1 and 3. The said lever 36 at its load point has the ball 38, which rests in a cup formed on the upper surface of the valve 34, the lever 36 being correspondingly cupped or shaped to engage the ball. The power end of the lever 36 is engaged by the weight 14 of the diaphragm 13, the lever having an opening therethrough to receive the pin 39 which also extends into a hole in the weight 14, the said pin 39 extending through a fluid tight joint 40 in the casing 11, and being provided with a stop flange 41 to hold it in normal position. The lower end of the pin 39 has a spiral spring 42 which is tensioned between the casing and a flange 43 at the lower end of the pin, and tends to hold the pin in the normal position shown in Fig. 1.

With the parts in the position shown in Fig. 1 it will be seen that fluid coming in at the inlet 19 will enter the chamber 21, filter through the screen 23, and pass up through the valve casing 26, going by way of the port 29 to the chamber below the diaphragm, and thence to the outlet 20, from which it is led to the point of consumption by any suitable means.

As the consumption of the fluid increases or diminishes the weighted diaphragm 13 will fall or rise in proportion to the pressure exerted in the diaphragm chamber, and through the lever 36 and leverage transmitting elements described force the valve 30 from its seat, or permit it to close under the influence of the spring 31 in exact proportion to the consumption of fluid.

It will be observed that the valve 30 which regulates the flow of fluid through the port 29 closes with the flow instead of against it, giving a distinct advantage, in that a closer regulation can be secured. In this type of regulator a valve closing with pressure will maintain delivery pressure substantially the same in volume, regardless of inlet pressure from the supply, for if inlet pressure coming from 19 should for any reason be reduced the weight carried by the diaphragm would fall, and the regulating valve 30 would by this action be opened wider, thus increasing the volume in spite of the lower pressure, an advantage which is not present where a valve closes against the pressure, for in such latter case any dropping of pressure would result in diminution of the valve opening, and a consequent cutting off of the volume.

The cut-out valve 34 under normal working of the regulator serves simply as an element of the operating means for the regulating valve 30, and is without function except in event of a very sudden reduction of the pressure beneath the diaphragm due to a cessation of flow, either on the inlet side of the valve, or a complete destruction of the pressure on the outlet side beneath the diaphragm, due to breakage of the pipes, or some other accident, which brings about a dangerous condition. Under these circumstances it is obvious that the weighted diaphragm will fall, forcing the lever 36 downwardly, and seating the valve 34 on the valve seat 27 so as to completely close the port 29. Under such circumstances the regulator automatically cuts off the flow of fluid, and should the fluid be again brought by way of the inlet 19 to the valve chamber 21, it could not pass to the diaphragm chamber until the regulator had been again set or started in operation.

This starting of the regulator, both initially and after any accident which has caused the device to automatically cut out the flow of fluid, is accomplished by the pin 39 heretofore referred to, which pin, as is obvious, may be projected into the diaphragm chamber, and when its end engages the weight 14 of the diaphragm will lift the same, relieving the lever 36 and the valve parts operated thereby from pressure, and allowing the spring 31 to lift the cut-out valve from its seat, permitting the fluid to fill the diaphragm chamber and sustain the diaphragm, and the automatic regulation of the valve 30 then continues, the pin 39 immediately it is released from the finger of the operator returning to the normal position shown in Fig. 1.

In the form of the invention shown in Fig. 5 the device is used simply as a regulator, and the automatic cut-out feature is dispensed with.

As will be seen from the construction shown in Fig. 5, the cut-out valve is dispensed with, and I provide a regulating valve 44, from which projects the pin 45, which passes through the port 46 as in the other form, and engages the lever 47, which is fulcrumed at its end in the slotted segment projecting from the valve casing 48, as heretofore described. The end of the lever 47 engages a fixed pin 49 projecting into the diaphragm casing, and into a suitable hole in the diaphragm weight, exactly as heretofore described, the diaphragm weight 50 bearing upon the lever 47 and operating it and the valve 44 in the manner heretofore described. As this form of device simply regulates it is obvious that the necessity of the starting pin shown in the other form is done away with, but the operation of the valve 44 in the matter of regulation and its opening and closing of the port 46 is identical with the operation of the valve shown in Fig. 1, and heretofore described.

The regulator will be provided with any desired or customary mercury seal 51, comprising the usual mercury cup with the relief passage 52 leading from the lower diaphragm chamber thereto, and passing to an outlet 53 connected with a suitable escape pipe, so that in event of breakage of the diaphragm, or an abnormal pressure in the diaphragm chamber due to any unusual conditions, the fluid cannot escape from the regulator, but will blow the seal and pass to the escape pipe.

I claim:—

1. In a fluid pressure regulator, the combination with a diaphragm casing having an inlet and an outlet, of a diaphragm therein, a valve chamber integral with and depending from said diaphragm casing, a valve casing within said chamber and spaced from the wall thereof, a double valve seat in said valve casing having a port therethrough, a regulating valve on one side of said valve seat, a cut-off valve on the opposite side of said valve seat, a spring in said valve casing normally urging said regulating valve to its seat, means connecting said valves to insure simultaneous movement, and means operated by said diaphragm to actuate said valves.

2. In a fluid pressure regulator, the combination with a diaphragm casing having an inlet and an outlet, of a diaphragm therein, an integral valve casing depending from said diaphragm casing, a valve casing depending within said valve chamber and spaced from the walls thereof, a regulating valve in said valve casing, a spring in said casing normally urging said valve to its seat, means operated by said diaphragm to control said valve, and a cap closing said valve chamber and serving as a support for said spring.

3. In a fluid-pressure regulator, the combination with a diaphragm casing having an inlet and an outlet, of a diaphragm therein, a valve chamber having at one end a screen-receiving seat, a screen in said valve chamber, valve parts within said chamber, and a closing cap for said chamber adapted to engage said screen and valve parts and maintain them in operative position.

4. In a fluid-pressure regulator, the combination with a diaphragm casing having an inlet and an outlet, of a diaphragm therein, a valve chamber communicating with said casing, a valve casing depending within said chamber, a regulating valve polygonal in cross section within said valve casing, a spring tending to close said regulating valve, a valve operating stem fixed to said valve and projecting through the valve seat into the diaphragm chamber, and a valve operating lever engaging said stem and operable by said diaphragm to actuate said valve.

5. In a fluid-pressure regulator, the combination with a diaphragm casing having an inlet and an outlet, of a diaphragm therein, a valve chamber having an unobstructed bore depending from said diaphragm casing and to which said inlet delivers, a valve casing secured to said diaphragm casing and depending within said chamber, a valve seat and a valve within said casing, means operated by said diaphragm to actuate said valve, a screen within said chamber inclosing said valve casing and valve, and a cap for said valve chamber adapted to hold said screen and valve in position.

6. In a fluid-pressure regulator, the combination with a diaphragm casing having an inlet and an outlet, of a diaphragm therein, a valve chamber depending from said diaphragm casing and to which said inlet delivers, a valve casing depending within said chamber, a double valve seat in said casing, a regulating valve closing with inlet pressure on one side of said valve seat, a cut-out valve on the other side of said valve seat, means connecting said valves for simultaneous movement, a diaphragm-operated lever to actuate said valves, a cupped seat in said cut-out valve, and an anti-friction ball in said cupped seat on which said lever bears.

7. In a fluid-pressure regulator, the combination with a diaphragm casing having a valved inlet and an outlet, of a diaphragm in said casing having a diaphragm weight, a starting pin engaging said diaphragm weight and extending through a fluid-tight joint in a wall of the casing by means of which said diaphragm may be lifted, means on said pin to prevent its withdrawal from said casing and a spring on said starting pin to return it to inoperative position.

8. In a fluid-pressure regulator, the combination with a diaphragm casing having an inlet and an outlet, of a diaphragm therein, a valve chamber depending from said diaphragm casing and to which said inlet delivers, a valve casing depending within said chamber, a valve in said valve casing, a diaphragm-operated lever to actuate said valve, a cupped seat in said valve, and an anti-friction ball in said cupped seat on which said lever bears.

9. In a fluid-pressure regulator, the combination with a diaphragm casing having a valved inlet and an outlet, of a diaphragm in said casing having a diaphragm weight, a starting pin engaging said diaphragm weight and extending through a fluid-tight joint in a wall of the casing by means of which said diaphragm may be lifted, a flange on said pin seating against the fluid-tight joint to prevent withdrawal of the pin from the casing, and a spring on the outer end of said pin to maintain the pin normally in retracted position.

10. In a fluid-pressure regulator, the combination with a diaphragm casing having an inlet and an outlet, of a diaphragm therein, a valve controlling said inlet, a lever operated by said diaphragm to actuate said valve, and a diaphragm lifting pin operable from the outside of said casing to which said lever is connected.

11. In a fluid-pressure regulator, the combination with a diaphragm casing having an inlet and an outlet, of a diaphragm therein, a valve controlling said inlet, a lever operated by said diaphragm to actuate said valve, and a diaphragm lifting pin operable from the outside of said casing to which said lever is connected, and a spring on said lifting pin to return it to inoperative position.

12. In a fluid-pressure regulator, the combination with a diaphragm casing having an inlet and an outlet, of a diaphragm therein, a valve controlling said inlet, a diaphragm-operated lever which actuates said valve, an unattached anti-friction member forming a connection between said lever and said valve, and a pin engaging said diaphragm and extending through a fluid-tight joint in the wall of the diaphragm casing.

13. In a fluid-pressure regulator, the combination with a diaphragm casing, having an inlet and an outlet, of a diaphragm therein, a valve chamber depending from said diaphragm casing and to which said inlet delivers, a valve casing depending within said chamber, a double valve seat in said casing, a regulating valve closing with inlet pressure on one side of said valve seat, a cut-out valve on the other side of said valve seat, means connecting said valves for simultaneous movement, a diaphragm operated lever to actuate said valves, a cup-seat in said cut-out valve, an anti-friction ball in said cup-seat on which said lever bears, and a starting pin engaging the diaphragm and extending through a fluid-tight joint near the wall of the diaphragm casing by means of which said diaphragm may be lifted.

14. In a fluid pressure regulator, the combination with a diaphragm casing having an inlet and an outlet, of a diaphragm therein, a valve chamber depending from said diaphragm casing and to which said inlet delivers, a valve casing depending within said chamber, a double valve-seat in said casing, a regulating valve closing with inlet pressure on one side of said valve seat, a cut-out valve on the other side of said valve seat, means connecting said valves for simultaneous movement, a diaphragm operated lever to actuate said valves, a cup-seat in said cut-out valve, an anti-friction ball in said cup-seat on which said lever bears, a starting-pin engaging the diaphragm and extending through a fluid-tight joint near the wall of the diaphragm casing by means of which said diaphragm may be lifted, and a spring on said starting pin to return it to inoperative position.

15. In a fluid-pressure regulator, the combination with a diaphragm casing having an inlet and an outlet, of a diaphragm therein, a valve controlling said inlet, a lever fulcrumed at its outer end having engagement with said valve, and a diaphragm lifting pin extending through a fluid-tight joint in the wall of the diaphragm and having connection with said diaphragm, the inner end of said lever having an opening to receive said pin and being in engagement with said diaphragm so that it is operated by said diaphragm to actuate said valve.

16. In a fluid pressure regulator, the combination with a diaphragm casing having an inlet and an outlet, of a diaphragm therein, a valve controlling said outlet, means operated by said diaphragm to actuate said valve, a diaphragm lifting pin operable from the outside of said casing to which said means is connected, and a spring on said lifting pin to return it to inoperative position.

17. In a fluid pressure regulator, the combination with a diaphragm casing having an inlet and an outlet, of a diaphragm therein, a valve controlling said inlet, means operated by said diaphragm to actuate said valve, a diaphragm lifting pin operable from the outside of said casing to which said means is connected, a flange on said pin seating against a fluid tight joint to prevent withdrawal of the pin from the casing, and a spring on said lifting pin to return it to inoperative position.

In testimony whereof I have hereunto set my hand in presence of two subscribing witnesses.

ARTHUR W. CASH.

Witnesses:
CHARLES G. AUER,
MABEL McINTYRE.